United States Patent [19]
Knapp

[11] Patent Number: 4,733,694
[45] Date of Patent: * Mar. 29, 1988

[54] MIXING VALVE WITH HYDRAULIC RESPONSIVE MOVABLE FIELD

[75] Inventor: Alfons Knapp, Biberach an der Riss, Fed. Rep. of Germany

[73] Assignee: Masco Corporation, Taylor, Mich.

[*] Notice: The portion of the term of this patent subsequent to Sep. 9, 2003 has been disclaimed.

[21] Appl. No.: 816,147

[22] Filed: Jan. 3, 1986

[51] Int. Cl.⁴ ............... F16K 11/078; F16K 25/00
[52] U.S. Cl. ........................ 137/625.17; 137/625.4; 251/172; 251/174
[58] Field of Search ........... 137/625.17, 625.4, 625.41; 251/172, 174, 175, 176

[56] References Cited

U.S. PATENT DOCUMENTS 3,504,885  4/1970  Hulsey ..................... 251/174 X
4,250,912  2/1981  Knapp ..................... 137/454.6 X Primary Examiner—Alan Cohan
Assistant Examiner—John A. Rivell
Attorney, Agent, or Firm—Steven L. Permut; Malcolm L. Sutherland; Leon E. Redman

[57] ABSTRACT

A mixing valve for a faucet includes a faucet body with a chamber that receives a cartridge. The cartridge has an axially movable bottom section which seats a fixed plate. A movable plate is housed in the cartridge above the fixed plate and is connected to a controlling handle to cooperate with the fixed plate so as to regulate water flow in the mixing proportions. The bottom of the cartridge can axially move and is provided with two seals one operated between the cartridge and the faucet body and the other between the cartridge bottom and fixed plate. The total working area within the seal between the cartridge and faucet is larger than the total working area within the seal between the cartridge and fixed plate so that hydraulic pressure working within these areas finds the hydraulic force which biases the cartridge bottom upward to compress it against the fixed plate and the fixed plate against the movable plate. A spring can be interposed between the cartridge bottom and faucet body to apply a compressive preload onto the valve plates.

8 Claims, 2 Drawing Figures

MIXING VALVE WITH HYDRAULIC RESPONSIVE MOVABLE FIELD

TECHNICAL FIELD

This invention relates to faucet valves and more particularly single handle mixing valves that incorporate sliding valve plate members.

BACKGROUND OF THE INVENTION

Faucet valves that incorporate sliding ceramic plates have many advantages over other types of faucet valves. The ceramic elements are durable and provide for long life with virtually no leakage between the two highly polished valving surfaces of the respective ceramic valve elements. However, in order for the ceramic valves to work in the faucet environment, the valves must be slidable under compressive force. Commonly, this compressive force is obtained by having the lower stationary valve member seated on resilient elastomeric seals. The upper portion of the valve must have all its elements dimensioned precisely so that the movable valve element will be under compressive force. Manufacturing tolerances have to be within a certain range in order for the resilient elastomeric seal to function properly. If the total height of the internal valve members is too great, the elastomeric seal becomes overly compressed and the ceramic valve members are pressed against each other with too great a force and are therefore hard to operate.

On the other hand, if the total height of the internal valve members is too little, the resilient elastomeric seal pushes the fixed valve element fully upward; however, the two ceramic valve members are still not adequately pressed together so that leakage between the fixed ceramic plate and the movable top ceramic plate still occurs.

Hydraulic pressure can be used to press the stationary valve up against the ceramic valve plate. Hydraulic pressure is used to press ceramic plates together in a faucet valve disclosed in my U.S. Pat. No. 4,250,912 issued on Feb. 17, 1981 entitled "A Faucet Valve".

However, in single handle mixing valves it must be assured that the hydraulic pressure not only pushes the cartridge portion upward to press the fixed plate against the movable plate, but also that separation between the cartridge lower section and the fixed plate does not occur due to the same hydraulic pressures.

SUMMARY OF THE INVENTION

According to one aspect of the invention, a mixing valve for a faucet includes a faucet body that receives a cartridge. The cartridge includes an axially movable cartridge bottom section with a fixed plate seated on the cartridge bottom and a movable plate mounted on the fixed plate. The movable plate is connected to controlling means and cooperates with the fixed plate so as to regulate water flow rates in mixing proportions. The cartridge bottom is axially movable and responsive to hydraulic pressure and moves upward to exert a compressive force between the movable fixed plate and cartridge bottom itself.

The upward movement is provided by hydraulic pressure exerted on the working surface area within the seals that are interposed between the cartridge bottom and faucet body. The working surface area of these seals is larger than the total working area within the seals between the cartridge bottom and the fixed plate. Therefore the hydraulic pressure interposed between the fixed plate and cartridge bottom which would tend to separate the two elements is overcome by the greater hydraulic pressure exerted on the cartridge bottom to bias the cartridge bottom against the fixed plate and in turn the movable plate. Hence the cartridge bottom acts as a piston that is biased upwardly and prevails against any hydraulic pressure which would tend to separate the fixed plate from the cartridge bottom.

The compressive force exerted between the fixed plate and movable plate assures against leakage and provides for the correct operation of the valve plates.

In those cases when hydraulic pressure is lacking or before or after the faucet installation attachment of the valve plates can take place, to prevent separation, a spring can be placed between the faucet body and the cartridge bottom to exert an upward bias onto the cartridge bottom.

Furthermore, because the cartridge bottom is axially movable, it can compensate for every manufacturing tolerance and for cartridge thermal expansions thereby avoiding any improper operation of the faucet due to these potential problems.

BRIEF DESCRIPTION OF THE DRAWINGS

Reference now will be made to the following drawings in which.

DETAILED DESCRIPTION OF THE PREFERRED EMBODIMENT

Figure 1:
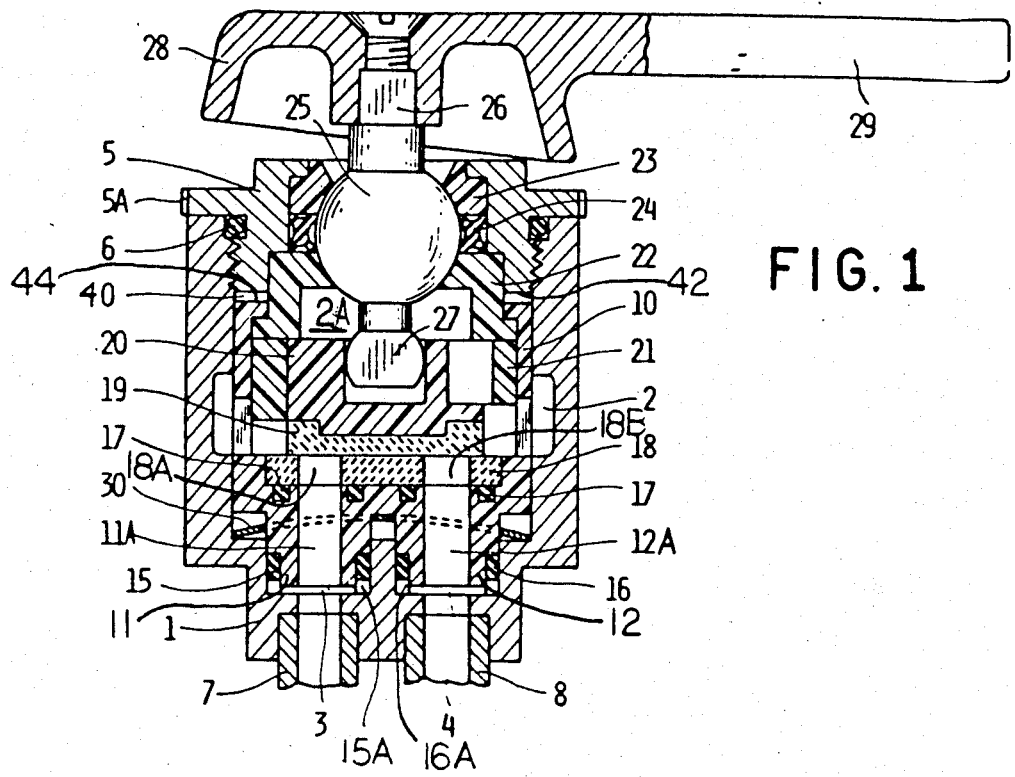
FIG. 1 is a segmented view of a mixing valve according to the invention.

A faucet, according to the invention, contains a body 1 at whose bottom arrive two water flow pipes 7 and 8, respectively hot and cold, which open in correspondence with the seating bores 3 and 4 in the bottom of the faucet body 1. The body 1 has a cartridge receiving chamber 2A and an annular chamber 2 communicating with an outlet connection not represented. The body 1 includes a closure cap 5 which has a seal 6. The cap is screwed as usual, but it has a peripheral knurl 5A through which the cap 5 can be hand applied or hand removed.

The cartridge 2 includes a bottom envelope 10 which is preferably built with plastics and is introduced into the boring of the faucet body 1 with axial mobility. The envelope 10 has two extending connections 11 and 12 provided with seals 15 and 16. Each seal is suitably sized to penetrate and to be sealed in the seating bores 3 and 4 of the faucet body which communicate with the pipes 7 and 8. Each connection 11 and 12 has a passage 11A and 12A therethrough. The passages 11A and 12A are surrounded inside the envelope 10 by a seal 17 which is, in this case, replaced by two separated annular shaped pieces housed in corresponding seats inside the envelope bottom 10. The seal 17 could be composed of a single piece with a more complex shape. The seal 17 sealingly seats a fixed valve plate 18 mounted on the seal 17 in the envelope 10.

The fixed plate 18 has two openings 18A and 18B in correspondence with the passages 11A and 12A for the hot and cold water outflow. In contact with the fixed plate 18 is mounted a movable valve plate 19 jointly with a control slide 20 translationally movable within a ring 21 which in turn rotates in the envelope 10. The slide 20 abuts against a half bearing 22 fixed at the opening of the envelope 10. The half bearing 22 in turn abuts against the cap 5 which closes the faucet body 1.

Another half bearing 23 is housed in the cap 5 and between the half bearings 22 and 23 is housed a connection ball 25 which is sealed by a seal 24. An arm 26 extends outwardly from ball 25 to which is connected a handle member 28 with a driving lever 29. A second arm 27 extends inwardly from the ball 25. The arm 27 is flat and works in a corresponding seat of the control slide 20.

This construction is known and allows, by differently rotating and inclining the lever 29, to shift the control slide 20 and then the movable plate 19, in translation and rotation over the fixed plate 18 so as to regulate the total and proportional flow which, coming from the pipes 7 and 8, enters chambers 2A and 2 before being discharged into the spout (not shown). Interposed between the bottom of the carriage envelope 10 and the body bottom 1 is placed a spring 30 consisting of a perforated disc for the passage of the extending connections 11 and 12. The disc is cambered for working as a repulsion elastic spring between the body bottom 1 and the bottom of the cartridge envelope 10. This spring 30 is constructed so as to supply a biasing force sufficient to assure the abutment between the plates 18 and 19 of the faucet, and the application by a certain pressure of the bottom 10 of the cartridge envelope, through the seal 17 and against the fixed plate 18.

Independently of the feeding pressures for hot and cold water, the spring 30 exerts a force on the bottom of the cartridge envelope 10 directed towards the cap 5. The force is transmitted from the envelope bottom 10 to the fixed plate 18 and from the latter to the movable plate 19, to the slide 20, to the half bearing 22 and to the cap 5. The force keeps in contact the cartridge bottom 10 and the fixed plate 18 (through the seal 17) and the plates 18 and 19 together. Therefore, the spring assures a regular working of the faucet at low pressure.

Figure 2:
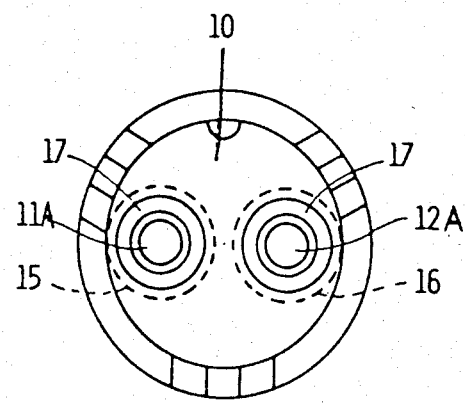
FIG. 2 is a top plan view of the cartridge bottom containing the seals for the fixed plate.

The water pressure through the pipes 7 and 8, works on the extended connections 11 and 12 so the extended connections function like a piston, pushing the envelope 10 toward the discs 18 and 19. The pressure, working inside the envelope bottom 10 in the space limited by the seal 17, is inclined to separate this bottom from the fixed disc 18. This negative force turns out to be lesser (due to the lesser working area with seal 17 relative to the working area within seals 15 and 16 as shown in FIG. 2) than the positive force exerted on the extended connections 11 and 12; so the net force is directed toward the cap 5, and prevails against the force inclined to separate the envelope bottom 10 from the disc 18 and the two discs 18 and 19 one from the other.

As a consequence, although the feeding pressure increases, an adequate adhesion between the plates and between them and the bottom of the cartridge envelope is always guaranteed. As no appreciable force of inertia concerns the operation of the faucet, the hydraulic pressure forced compression of the plates and bottom not only occurs in static conditions but in the presence of water hammers as well.

Proper planning and sizing of the components allows in most cases to proportion the force exerted by the water pressure so as to avoid over compression between the plates which can cause faucet motion to be too hard or stiff in the presence of high supply pressures. However, if it is necessary, it is also possible to limit the action of the pressure. For example, a gap 40 existing between the abutment shoulder 44 of envelope 10 and the abutment shoulder 42 of cap 5 such that, after a prefixed compression of the inner parts of the cartridge, the abutment shoulder 44 of envelope 10 abuts against the cap shoulder 42 thus directly shunting any force exceeding a prefixed limit from being exerted onto the plates 18 and 19.

The spring for precharging between the faucet body and the cartridge, can also be fashioned in a different form than that of one spring or more. For example, as shown in FIG. 1, the seals 15 and 16 of the extending connections 11 and 12 can extend with elastic appendices 15A and 16A as far as the bottom of the faucet body supplying the precharging force. The springs, as shown according to FIG. 1, can co-exist or can be present singly or can be replaced by any other suitable springs. However, the existence of a precharging spring is not essential for the application of the invention. Particularly in those cases when we do not think that an accidental detachment between the plates or between the fixed plate and the cartridge bottom may occur, or when measures for preventing it (for example, the application of a grease able to keep the parts together during the transport and installation) are taken, or when it is foreseen that the plumber is careful to establish or re-establish the adhesion among the parts before starting fluid flow, we can eliminate the usage of any precharging elastic tools and use only the action of the hydraulic pressure.

The cartridge used in the represented realization form is a complete replaceable cartridge containing all the control mechanisms of the faucet. However, for the application of this invention, the cartridge can reduce to a simple movable bottom provided with seal connections operating between this bottom and the seats of the faucet body and supporting through a seal, the faucet fixed plate; in this case, the mechanisms can be put together directly in the faucet body. The reduced cartridge can be adopted when it is not necessary to replace the mechanisms easily and quickly.

Of course, different changes in addition to those above mentioned can be made to what is described and shown. For example, the cap 5 can be affixed to the body through a bayonet joint or through an elastic clip or in another manual way. The particular form of the inner mechanisms of the cartridge is not important for the application of the invention and when it can vary in comparison to the above mentioned.

Variations and modifications of the present invention are possible without departing from the scope and spirit as defined in the appended claims.

The embodiments of the invention in which an exclusive property or privilege is claimed are defined as follows:

1. A mixing valve for a faucet characterized by:
   a faucet body having a cartridge receiving chamber and fluid inlets;
   a replaceable cartridge in the chamber of the faucet body having an axially movable bottom that moves in response to hydraulic pressure from at least one said inlet;
   a fixed plate mounted on the cartridge movable bottom;
   a movable plate housed on top of said fixed plate;
   means operably connected to the movable plate for moving said plate relative to the fixed plate so as to regulate water flow and mixing proportions from said fluid inlets;

the cartridge bottom being provided with a first seal means operating between the cartridge bottom and the fluid inlets of the faucet body;

the cartridge bottom being provided with a second seal means interposed between the cartridge bottom and the fixed plate with the total working area within the second seal means being smaller than the total working area within the first seal means such that hydraulic pressure trying to separate the fixed plate from the cartridge bottom is overcome by the hydraulic pressure biasing the cartridge bottom against the fixed plate and to apply a compressive force between the fixed and movable plates.

2. A mixing valve as defined in claim 1 further characterized by:

a resilient biasing means interposed between the cartridge bottom and faucet body for preloading a compressive force between said cartridge bottom, said fixed plate, and said movable plate.

3. A mixing valve as defined in claim 2 further characterized by:

said resilient biasing means including a cambered flexible disc.

4. A mixing valve as defined in claim 2 further characterized by:

said resilient biasing means comprising appendices of the first seal means of the cartridge abutting elastically against the bottom of the faucet body.

5. A mixing valve as defined in claim 1 further characterized by:

said cartridge bottom including two extensions with passages therethrough, each extension circumscribed by said first seal means which seals said extension in a respective bore in said body leading to said fluid inlets.

6. A mixing valve as defined in claim 5 further characterized by:

a cambered flexible disc spring having apertures for receiving said extensions and being interposed between said faucet body and said cartridge bottom for preloading a compression force between said cartridge bottom, said fixed plate, and said movable plate.

7. A mixing valve as defined in claim 1 further characterized by:

abutment means between said faucet body and said cartridge bottom that limits the maximum compressive force applied onto the cartridge and valve plates by hydraulic pressure.

8. A mixing valve as defined in claim 1 further characterized by:

said abutment means including a shoulder on a cap of said faucet body and a shoulder on said cartridge bottom spaced apart a predetermined distance from said cap shoulder when installed in said chamber and movable upward until it abuts said cap shoulder.

* * * * *